Patented Sept. 12, 1944

2,358,276

UNITED STATES PATENT OFFICE 2,358,276

DIHYDRIC ALCOHOL MODIFIED MELAMINE FORMALDEHYDE CONDENSATION PRODUCTS AND PROCESS FOR PRODUCING SAME

Theodore S. Hodgins and Philip Stanley Hewett, Royal Oak, and Almon G. Hovey, Birmingham, Mich., assignors to Reichhold Chemicals, Inc., Detroit, Mich.

No Drawing. Application August 27, 1941, Serial No. 408,548

4 Claims. (Cl. 260—72)

This invention relates to new and useful products and the process for the production of resinous condensation products from melamine (amino-triazine), formaldehyde and dihydric alcohols, particularly glycols.

To our knowledge, these products and process have never before been described. We are aware of Widmer and Fisch, U. S. Patent 2,197,357 (April 16, 1940), who describe resinous condensation products from an aldehyde, a poly-alcohol and a triazine. Specifically, we differ in both product and process as is readily apparent upon examination of the examples disclosed. We are further aware of Ellis, U. S. Patent 2,162,331 (June 13, 1939), who discloses an aminoplast of thixotropic characteristics. Ellis' products are vastly different from those we disclose in that his products are thixotropic in nature. On the other hand, the products we are about to describe are not thixotropic. Our process is a two stage condensation process involving (A) initial condensation and partial dehydration and (B) etherification, in contrast to Ellis. In an article entitled "Melamine-formaldehyde film forming compositions," Ind. Eng. Chem. 33, 769–779 (June, 1941), we have disclosed dihydric alcohol modified melamine-formaldehyde condensation products.

Our invention resides in the discovery that new, useful and economical products can be produced at melamine formaldehyde ratios of 1.0/3.0–1.0/4.0. For reasons of economy, with respect to the use of these products we prefer to operate at the lower formaldehyde ratio, 1.0/3.0 and a modifier, glycols, at a melamine to modifier ratio of 1.0/2.0–1.0/4.0.

Our process is made possible by the discovery that new, useful and stable products may be produced by a partial vacuum dehydration of melamine-formaldehyde condensed at elevated temperatures in ratios of 1.0/3.0–1.0/4.0 under certain specific pH conditions. The initial pH of the aqueous formaldehyde is adjusted to a value of 7.5–8.5, depending upon the conditions of carrying out the subsequent resinification (condensation). In carrying out this condensation, we remove about 50 to 60% of the aqueous portion of the formaldehyde including the methanol fraction, under a pressure of 30–100 mm. Hg at a temperature of 50 to 60° C. The pH-gradient is dependent upon (1) the time and temperature of the initial condensation reaction and (2) time and temperature of the partial dehydration reaction; an initial pH of 7.5–8.5 drops to 6.0–7.0 after 50–60% of the aqueous portion of the formaldehyde is removed. After the addition of the etherifying reactant (dihydric alcohol) and subsequent heating, the pH has fallen to a value of 5.5–6.5. This increase in acidity assists in the subsequent etherification and resinification of the partially dehydrated initial condensation product. We have found these mild controlled conditions to be optimum for the reaction between glycols and a melamine-formaldehyde condensation product in the ratios of 1.0/3.0–1.0/4.0.

We have found that these glycol modified melamine-formaldehyde products, in contrast to similar products based on urea-formaldehyde are especially useful in the formulation of printing inks in which the following characteristics are desired: (1) lack of odor (2) minimum of offset (3) quick drying (4) freedom from softening and bleeding (5) increased brilliance and cleanness (6) cleaner and sharper printing (7) non-rub and non-scratch (8) greater coverage (9) no crystallization (10) increased strength (11) non-thixotropic (12) non-skinning. Inks formulated from these products may be set by contact with an excess of moisture. This excess of moisture may be produced by directing steam on the freshly printed ink, hardening the outer surface instantly, thus preventing offset and stick as the printed material goes into delivery or rewind. These inks possess a controllable water tolerance which, coupled with the fact the the solvent possesses low vapor pressure, accounts for the fact that these inks will remain open on the press for long periods of time. Further, we have found that these dihydric alcohol modified melamine formaldehyde products in contrast to similar modified urea-formaldehyde products, possess excellent water resistance when converted.

The following examples serve to illustrate the process of carrying out our invention:

EXAMPLE 1.—(MELAMINE/FORMALDEHYDE/ DIETHYLENE GLYCOL=1.0/3.0/2.1)

A. *Initial condensation*

|  | Grams |
|---|---|
| 37% aqueous formaldehyde (270 mols) | 21,870 |
| 26% aqueous ammonia | 732 |
| Melamine (2,4,6 triamo 1,3,5 triazine (90 mols)) | 11,340 |

The melamine (90 mols) was added to the formaldehyde (270 mols) containing 732 grams aqueous 26% ammonium hydroxide, the pH range being 7.5–8.5. The material was heated to 90° C. in 60 minutes and held at 90° C. for 20 minutes. Vacuum was applied (30–100 mm. Hg) at a temperature of 50–60° C. and 8000 grams of distillate were removed which represents 58% of the water and methyl alcohol contained in the aqueous formaldehyde. The resulting clear indicating the absence of crystalline or amorphorus melamine-formaldehyde condensation products) viscous mass (viscosity at 25° C. $Z_6+$, (Gardner Holdt) over 200 poises) was then heated to 90° C.

B. Etherification

While increasing the heat to 90° C., 20,000 grams (189 mols) of diethylene glycol (2,2'-oxydiethanol) were added. The material was held at 90° C. for 5 to 10 minutes until a viscosity of U–V at 25° C. was reached and then cooled to 50° C. before pressing out. Total etherification time i. e., contact time between partially dehydrated initial condensation product and diethylene glycol was 90–120 minutes. A yield of 45,460 grams of clear water-white resinous material was obtained at a solids content of 60% which equals 27,280 grams of solid resin. The alkoxy content calculated by the following formula is 1.0.

Alkoxy content=Z (ratio of mols of etherifying agent per mol of melamine)

$$Z = \frac{Y - [m + f - (M \times 18)]}{AM}$$

Where,
Y equals solid resin yield
M equals mols of melamine
A equals molecular weight of etherifying alcohol
m equals weight of melamine
f equals weight of $CH_2O$.

Thixotropic characteristics=none
Viscosity at 25° C.=U–V (Gardner-Holdt) (8.0 poises)
Acid number=0.33 mg. KOH per gram of resin.

Solubility

Water=20%
Methanol=20%
Ethanol=15%
Diethylene glycol=infinite
Ethylene glycol=infinite
Glycerol=infinite
Monobutyl ether of diethylene glycol=25%
Mineral spirits=incompatible Note.—Similar results were obtained using a crude fraction of diethylene glycol containing propylene and butylene glycols, et al., obtained from Dow Chemical Company.

EXAMPLE 2.—(MELAMINE/FORMALDEHYDE/ETHYLENE GLYCOL=1.0/3.0/3.58)

A. Initial condensation

37% aqueous formaldehyde _____grams__ 1,094 (13.5 mols)
26% aqueous ammonia _____do____ 37
Melamine _____do____ 567 (4.5 mols)

Treat in a manner similar to Example 1, but 425 grams distillate removed=61.6%.

B. Etherification

To the initial condensation product (A) were added 1000 grams (16.11 mols) ethylene glycol (1,2-ethanediol). The temperature was increased from 60 to 85° C. in 30 minutes and held at 85° C. for 20 to 30 minutes, until a viscosity of T–U at 25° C. was obtained. Total etherification time was 90–120 minutes.

A yield of 2,220 grams of clear, water-white resinous material was obtained at a solids content of 50.2% which equals 1114 grams of solid resin.

Alkoxy content=0.8
Thixotropic characteristics=none
Viscosity at 25° C.=T–U (6.0 poises)
Acid number=0.42

Solubility

Water 30%, methanol 30%, ethanol 20%, diethylene glycol ethylene glycol and glycerol infinite, monobutyl ether of diethylene glycol 20%, and mineral spirits incompatible.

EXAMPLE 3.—(MELAMINE/FORMALDEHYDE/DIETHYLENE GLYCOL=1.0/3.0/3.08)

A. Initial condensation

37% aqueous formaldehyde _____grams__ 398 (4.92 mols)
26% ammonium hydroxide _____do____ 13.5
Melamine _____do____ 206 (1.63 mols)

Treat in a manner similar to Example 1, but 130 grams of distillate removed=52%.

B. Etherification

To the initial condensation product (A) were added 360 grams (3.4 mols) diethylene glycol. The temperature was increased from 60–85° C. in 30 minutes, and held at this temperature for 25 minutes to a viscosity at 25° C. of Y–Z. At this point 171 grams (1.62 mols) of additional diethylene glycol were added. Total esterification time was 90–120 minutes.

A yield of 958 grams of clear, water-white resinous material was obtained at a solids content of 48.8% which equals 467 grams of solid resin.

Alkoxy content=0.83
Thixotropic characteristics=none
Viscosity at 25° C.=U–VV (8.5 poises)
Acid number=0.35
Solubility, similar to Example 1.

EXAMPLE 4.—(MELAMINE/FORMALDEHYDE/PROPYLENE GLYCOL=1.0/3.0/2.92)

A. Initial condensation

37% aqueous formaldehyde _____grams__ 1,094 (13.5 mols)
26% aqueous ammonia _____do____ 37
Melamine _____do____ 567 (4.5 mols)

Treat in a manner similar to Example 1, but 415 grams distillate removed=60%.

B. Etherification

To the initial condensation product (A) were added 1000 grams (13.15 mols) propylene glycol (1,2-propandiol). The temperature was increased from 60 to 85° C. in 30 minutes and held at 85° C. for 20 to 30 minutes until a viscosity of U–V at 25° C. was obtained. The total etherification time was 90–120 minutes. A yield of 2,228 grams of clear, water-white resinous material was obtained at a solids content of 53% which equals 1,181 grams of solid resin.

Alkoxy content=0.85
Thixotropic characteristics=none
Viscosity at 25° C.=U–V (8.0 poises)
Acid number=0.30
Solubility, similar to Example 1.

EXAMPLE 5.—(Melamine/Formaldehyde/ Diethylene Glycol=1.0/4.0/2.0)

A. Initial condensation

| | | |
|---|---|---|
| 37% aqueous formaldehyde | grams | 324 (4.0 mols) |
| 26% aqueous ammonia | do | 11 |
| Melamine | do | 126 (1.0 mol) |

Treat in a similar manner to Example 1, but 125 grams of distillate removed=61.3%.

B. Etherification

To the initial partially dehydrated condensation product (A) were added 212 grams (2.0 mols) of diethylene glycol. The temperature was increased from 60 to 85° C. in 30 minutes and held at 85° C. for 25–30 minutes until a viscosity of T–U at 25° C. was obtained. The total etherification time was 90–120 minutes. A yield of 545 grams at 64.5% solids which equals 352 grams of solid resin was obtained.

Alkoxy content=1.0
Thixotropic characteristics=none
Viscosity at 25° C.=T–U (6.0 poises)
Acid number=0.4
Solubility, similar to Example 1.

We claim:

1. The process of producing clear, stable, water-white, heat and moistture convertible, non-thixotropic glycol modified melamine-formaldehyde resinous condensation products, consisting in that one mol of melamine is heat reacted with 3.0–4.0 mols of aqueous formaldehyde at a pH between 7.5–8.5 with ammonia as a catalyst at elevated temperature, subjecting the initially reacted mass to distillation under a pressure of 30–100 mm. Hg until 50 to 60% of the aqueous portion of the formaldehyde is removed and a pH of 6–7 is attained, heating the resultant intermediate resinous mass with 2.0 to 4.0 mols of a glycol at a temperature of 70 to 90° C. at 760 mm. Hg, until a reaction product is obtained comprising a resinous mass having (1) a minimum viscosity of 4.0 poises at 25° C., (2) a minimum alkoxy content of 0.5, (3) a maximum acid number of 0.5.

2. The process in accordance with claim 1 wherein the glycol employed is diethylene glycol.

3. The process in accordance with claim 1 wherein the glycol employed is propylene glycol.

4. The process in accordance with claim 1 wherein the glycol employed is ethylene glycol.

THEODORE S. HODGINS.
ALMON G. HOVEY.
PHILIP STANLEY HEWETT.